United States Patent [19]

Brooks, Jr.

[11] 3,917,022

[45] Nov. 4, 1975

[54] TWIN CUSHION SURFACE EFFECT VEHICLE

[75] Inventor: Eugene N. Brooks, Jr., Sterling, Va.

[73] Assignee: The United States of America as represented by the Secretary of the Navy, Washington, D.C.

[22] Filed: July 18, 1974

[21] Appl. No.: 489,774

[52] U.S. Cl. .................. 180/127; 180/116; 114/61; 114/67 R
[51] Int. Cl.² .......................................... B60V 1/02
[58] Field of Search ........... 180/116, 117, 118, 119, 180/120, 121, 122, 123, 124, 125, 126, 127, 128; 114/67 R, 67 A, 61

[56] References Cited
UNITED STATES PATENTS

| | | | |
|---|---|---|---|
| 3,182,739 | 5/1965 | Cockerell | 180/118 |
| 3,185,240 | 5/1965 | Eggington et al. | 180/21 |
| 3,190,582 | 6/1965 | Lippisch | 180/116 |
| 3,211,247 | 10/1965 | Rethorst | 180/118 |
| 3,221,831 | 12/1965 | Weiland | 180/116 X |
| 3,262,511 | 7/1966 | Carr | 180/126 X |
| 3,559,759 | 2/1971 | Hart | 180/121 X |
| 3,662,853 | 5/1972 | Love | 180/116 X |
| 3,757,699 | 9/1973 | Wirth | 180/118 X |

FOREIGN PATENTS OR APPLICATIONS

| | | | |
|---|---|---|---|
| 1,189,442 | 4/1970 | United Kingdom | 180/127 |
| 1,005,255 | 9/1965 | United Kingdom | 180/120 |

*Primary Examiner*—M. Henson Wood, Jr.
*Assistant Examiner*—John P. Silverstrim
*Attorney, Agent, or Firm*—R. S. Sciascia; Q. E. Hodges

[57] ABSTRACT

An air cushion vehicle with two separated, elongated independent cushions and with efficient aerodynamic connecting members therebetween is disclosed. They are attached to the payload carrying section of the vessel by the two semi-rigid aerodynamic members which are airfoils which provide auxiliary lift. The result is an air cushion catamaran. The increased stability of the design permits the craft to use higher skirts and operate over higher obstacles than conventional surface effects vehicles. The semi-rigid members absorb shock and thereby improve the habitability of the payload section of the craft.

2 Claims, 2 Drawing Figures

TWIN CUSHION SURFACE EFFECT VEHICLE

The invention described herein may be manufactured and used by or for the Government of the United States of America for governmental purposes without the payment of royalties thereon or therefor.

BACKGROUND OF THE INVENTION

This invention relates to vehicles supported by a pressurized cushion of air. These vehicles are commonly referred to as surface effects vehicles. This invention particularly relates to the placement of discrete air cushions with respect to each other and with respect to the main body of the vehicle itself which is in part an efficient aerodynamic surface operating in ground effect.

Prior art surface effects vehicles generally comprise a skirt of flexible material which surrounds the underside of the vehicle at its periphery. The result was that a single air cushion supported the vehicle during operation. Other prior art which teaches more than one cushion is not combined with an efficient aerodynamic structure operating in ground effect. U.S. Pat. No. 3,398,712 issued on 27 Aug. 1968 to Hardey et al is an example of the single cushion configuration. This concept has been modified by prior art patents by separating a single cushion into two or more cushions by partitioning the underside area of vehicles similar to that shown by Hardey et al. The partition may be made up of a variety of configurations. One such configuration is the skirt design shown in U.S. Pat. No. 3,515,238 issued on 2 June 1970 to Knuth et al. Knuth et al discloses a multiplicity of adjacent cushion cells which together lift the vehicle when the cells are pressurized. A similar configuration shown in U.S. Pat. No. 3,688,724 issued on 5 Sept. 1972 to Bertin comprises a plurality of truncated cylinder shaped cells suspended in a cluster within an outer peripheral skirt. Bertin's design sought to improve stability. Both the cells and the cushions are attached to the vehicle to define a cushion contiguous with the underbody of the craft.

Other skirt configurations divide up the underbody area by providing two or more cushions using a standard skirt design to provide the separation. The Gemco 5300 manufactured by the Gemco Corp., P.O. Box 707, Lynnwood, Washington 98036 which is shown in Jane's All the World's Hovercraft is an example of this configuration.

In all of the above mentioned prior art the cushion area was separated, if at all, to provide stability by retarding air flow from one portion of the underbody to another.

The conventional surface effects vehicle skirts do not permit roll stability to be independent from other properties of the skirt and cushion. Therefore, their skirt height is limited to approximately 20% of the beam of the vessel since greater skirt height would make the vessel susceptable to plow-in and roll. Because of this limitation in skirt height the size of obstacles which may be traversed is also limited.

Furthermore, the lower skirt height also limits the obstacle crossing capability in another respect. When an obstacle is traversed, forces are generated by deflection of the skirt which are transmitted to the body of the vessel and the crew's compartment. The habitability of the vessel for long periods is dependent upon decreasing these transmitted forces. In a conventional surface effects vehicle the mobility and speed of the vessel must be decreased to improve habitability. Habitability is a most important consideration since, at the present state of the art, it is one of the most unavoidable limits to mission duration.

In addition, conventional surface effects vehicles are aerodynamically inefficient. In a conventional surface effects vehicle aerodynamic drag is considerable so craft performance is limited particularly at high speeds.

SUMMARY OF THE INVENTION

A twin cushion surface effects vehicle with two discrete elongated surface effects cushions which are connected by an efficient aerodynamic structure operating in ground effect and separated by a distance sufficient to provide an extremely stable air cushion vehicle is disclosed.

OBJECTS OF THE INVENTION

It is an object of this invention to improve the overland and overwater surface ride quality and performance of surface effects vehicles.

Another object of this invention is to permit increased skirt height on an amphibious surface effects vehicle while maintaining the roll stability and total weight of conventional surface effects vehicles.

Another object of this invention is to permit surface effects vehicles to traverse higher obstacles than conventional surface effects vehicles and to decrease obstacle drag and body accelerations.

Another object of this invention is to provide a surface effects vehicle with a flexible connecting structure between the cushion and fuselage to absorb forces caused by traversing obstacles as well as to provide an efficient lifting body operating in ground effect to assist in supporting the craft during high speed operation.

DESCRIPTION OF THE INVENTION

Figure 1:
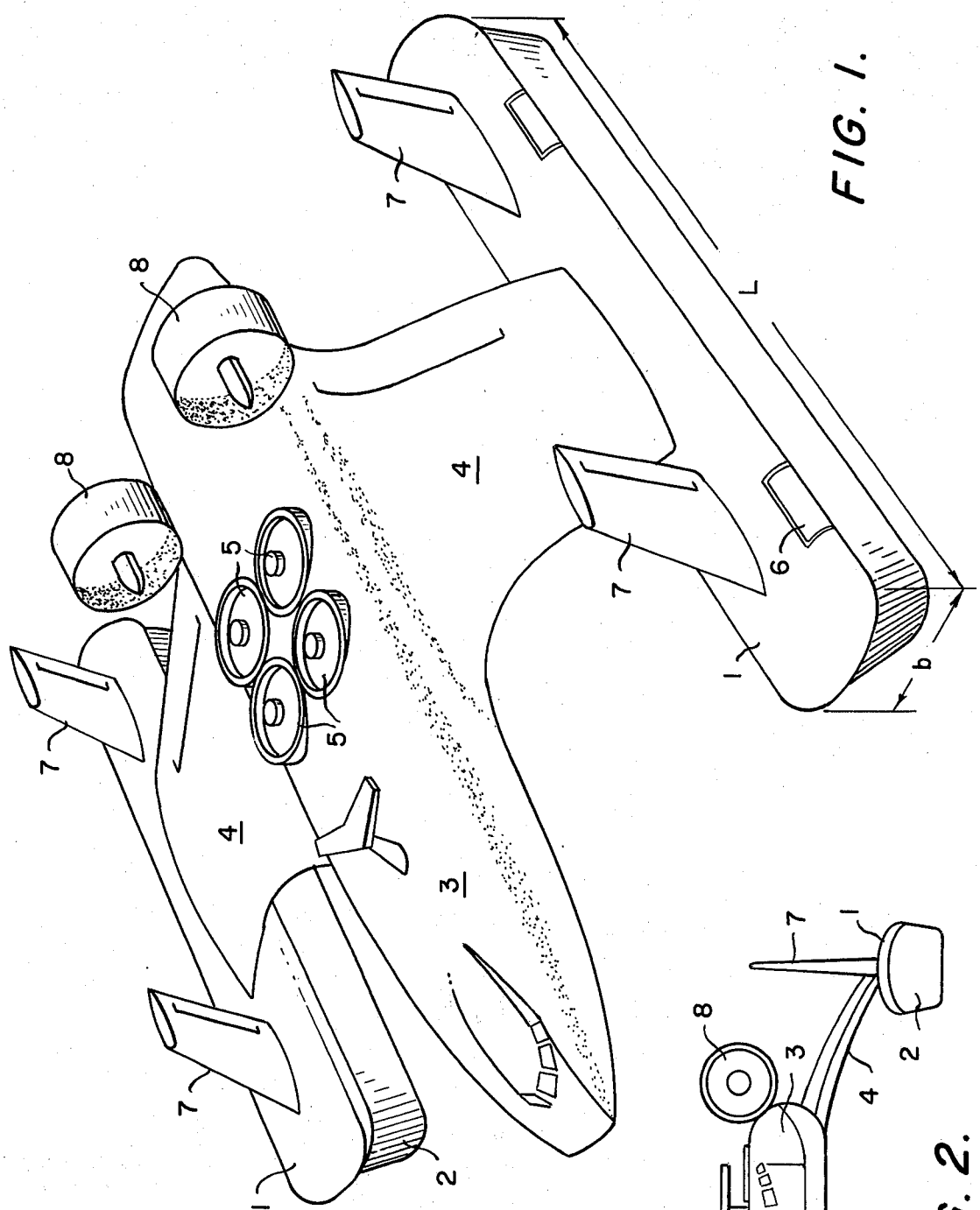
FIG. 1 shows a conceptual drawing of a surface effects vehicle of this invention in a perspective view.
Figure 2:
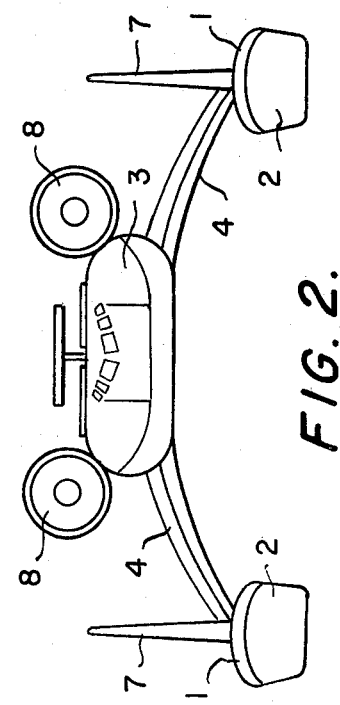
FIG. 2 is a front view of the surface effects vehicle shown in FIG. 1.

The invention is a twin cushion surface effects vehicle. Referring now to the drawings the twin cushions 1 are elongated structures incorporating any of a variety of flexible surface effect skirts 2 which are formed into a tall skirt height. The fuselage centerbody 3 which contains the crew and payload of the craft is attached by aerodynamic and flexible member 4. Member 4 is a lifting airfoil which assists in supporting the vehicle during high speed operation. The lifting foil may also enhance the manuverability of the craft. Member 4 may also contain internal ducts to transfer cushion air from the lifting fans 5 to the cushions 1. The fans may also be placed on the cushion hard structure. Cushion air may be vented from side ports 6 for enhancing low speed manuverability. Control surfaces 7 may be mounted for high speed yaw, tracking as well as conventional manuvering. Propulsive fans 8 are shown mounted on centerbody 3.

The separation of the cushions to provide a catamaran type vehicle is critical to produce effective roll stability which in turn permits the use of high skirt heights. The cushion separation should be in the range of 25% of the length of the craft or greater and should be complemented with an efficient aerodynamic surface therebetween which operates close to the surface and thereby supports part of the vehicle weight.

The high skirt height improves the effective range of the craft by reducing the amount of manuvering necessary to pass over rough terrain and by permitting it to maintain the high speeds at which it was optimally designed to operate.

The twin cushion catamaran shape achieves the required roll stability by virtue of its wide cushion span. It also achieves heave stability because of the inherent properties of the lengthwise dimension of the cushions. Therefore, roll stability is not as great a design consideration for the characteristics of the skirt configuration itself as in conventional surface effects vehicles. The roll stability constraints on the design of conventional surface effects vehicles require the incorporation of otherwise unnecessary features and hardware, such as stability bags, which inhibit the performance of the craft. By avoiding these constraints there is considerable latitude in skirt design. Therefore, a designer can design towards a skirt which more effectively follows ground contours and requires less ground to skirt clearance and decreases air loss from the cushion. In addition, the elongated cushions result in elimination of the high "hump" drag commonly associated with low length-to-beam ratio cushions at low speeds and therefore contribute greatly to the reduced drag of the vehicle. Each of these features enhances efficiency over conventional vehicles. As a corollary result the skirt becomes less suceptable to damage from snagging or impacting terrain obstacles.

The loss of the roll stability constraint permits wide latitude in the selection of cushion size and contour. For conventional surface effects vehicles there are many design tradeoffs between cushion size, cushion pressure, overall weight and hard structure size. The resulting design may result in non-optimal characteristics such as aerodynamic drag, friction drag, wave drag, hump drag, internal aerodynamic efficiency, structural weight and the size and shape of the hard structure. In the vehicle of this invention each of these properties can be optimized with less restrictions to increase the overall craft performance. These increases go beyond the mere additive increase in performance that would result in making the respective changes in a conventional surface effects vehicle.

The structural separation of the air cushions and the fuselage sections in the twin cushion craft results in distinct advantages which could not obtain in a conventional surface effects vehicle design. First, the connecting structural members 4 provide a shock absorption function and may be designed to an optimal suspension to improve ride quality for both men and machinery. Second, the fuselage is relatively high off of the ground or sea surface, therefore it is protected from collision from many obstacles. This height also improves radar and pilot visability. Third, the connecting structural members are efficient aerodynamic lifting bodies operating in ground effect. This ground effect phenomena, as is well known in the art, increases lift, decreases induced drag, and greatly increases wing efficiency due to the wings proximity to the ground. Furthermore, because air is passing under the centerbody and between the cushions the phenomenon of "channel flow" occurs. Channel flow and its association with its closeness to the ground surface increases the lift generated by the airfoils and enhances the lift to drag ratio. The lift from these foils reduces the lift demand on the catamaran cushions which decreases power requirements and the consumption of fuel.

The twin cushion catamaran craft as described in this disclosure has improved manuverability over conventional surface effects vehicles. Aerodynamic control surfaces 7 can be positioned and sized such that the forces generated pass through the horizontal plane in which the center of gravity of the craft lies. This permits the generation of very large side forces without the introduction of a roll moment into the craft. Also, large yaw moments can be produced when desired because the forces are produced at a substantial distance from the vertical axis that passes through the center of gravity.

The twin cushions as shown in the figures may themselves be divided into component cushions as required by reliability and other considerations.

Obviously many modifications and variations of the present invention are possible in light of the above teachings. It is therefore to be understood that the invention may be practiced otherwise than as specifically described, including application to surface effect ships which incorporate two elongated, solid side walled cushions separated by an aerodynamic surface or air foil.

What is claimed is:

1. A catamaran type surface effect vehicle which is supported during its operation by an air cushion comprising:

a first independent elongated flexible skirted air cushion;

a second independent elongated flexible skirted air cushion spaced from and parallel to said first air cushion;

an efficient aerodynamic lift airfoil and semi-rigid structural member, operating in ground effect, connecting and separating said first and said second air cushions; and a plurality of lifting fans mounted on said airfoil.

2. A vehicle as in claim 1 wherein control airfoil surfaces for controlling high speed yaw and tracking are mounted above the air cushions such that the force produced by said surfaces is in the horizontal plane of the center of gravity of the vehicle.

* * * * *